US009300200B2

(12) United States Patent
Kinoshita et al.

(10) Patent No.: US 9,300,200 B2
(45) Date of Patent: Mar. 29, 2016

(54) DC-DC CONVERTER THAT SUPPLIES VOLTAGE OF A DC POWER SUPPLY TO A LOAD WHILE BOOSTING OR STEPPING DOWN THE VOLTAGE OF THE DC POWER SUPPLY

(71) Applicants: Akihiro Kinoshita, Aichi (JP); Shinji Horio, Aichi (JP)

(72) Inventors: Akihiro Kinoshita, Aichi (JP); Shinji Horio, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/539,274

(22) Filed: Nov. 12, 2014

(65) Prior Publication Data
US 2015/0130440 A1 May 14, 2015

(30) Foreign Application Priority Data

Nov. 12, 2013 (JP) ................................ 2013-233744

(51) Int. Cl.
 *H02M 1/32* (2007.01)
 *H02M 3/158* (2006.01)

(52) U.S. Cl.
 CPC ............... *H02M 1/32* (2013.01); *H02M 3/158* (2013.01); *H02M 3/1582* (2013.01); *H02M 2001/325* (2013.01); *H02M 2001/327* (2013.01)

(58) Field of Classification Search
 CPC ......................... H02M 1/32; H02M 2001/327
 See application file for complete search history.

(56) References Cited

U.S. PATENT DOCUMENTS

| | | | | |
|---|---|---|---|---|
| 5,151,016 | A * | 9/1992 | Her | 417/32 |
| 6,335,577 | B1 * | 1/2002 | Baba | 307/28 |
| 2003/0210917 | A1 * | 11/2003 | Stewart et al. | 398/209 |
| 2006/0152180 | A1 * | 7/2006 | Tahara et al. | 318/139 |
| 2008/0018177 | A1 * | 1/2008 | Su et al. | 307/130 |
| 2013/0015833 | A1 * | 1/2013 | George et al. | 323/311 |
| 2013/0016448 | A1 * | 1/2013 | George et al. | 361/91.6 |
| 2013/0070497 | A1 * | 3/2013 | Liquicia et al. | 363/126 |
| 2013/0162033 | A1 * | 6/2013 | Origane et al. | 307/10.6 |

(Continued)

FOREIGN PATENT DOCUMENTS

| | | |
|---|---|---|
| JP | H09-327120 A | 12/1997 |
| JP | 2003-107123 A | 4/2003 |

(Continued)

OTHER PUBLICATIONS

Machine translation of reference (Michio, JP. Pub. No. 2003-107123).*

*Primary Examiner* — Timothy J Dole
*Assistant Examiner* — Yusef Ahmed
(74) *Attorney, Agent, or Firm* — Osha Liang LLP (57) ABSTRACT

A DC-DC converter includes a voltage conversion circuit boosting a voltage of a DC power supply and supplying the voltage to a load, a bypass circuit provided in parallel to the voltage conversion circuit, a drive circuit turning on and off a switching element of the bypass circuit, and a controller outputting a control signal for controlling the voltage conversion circuit and the drive circuit. A diode is connected in parallel to the switching element so as to be oriented toward a forward direction with respect to the DC power supply. A temperature detector of the drive circuit detects temperature of the diode. The drive circuit maintains the switching element in the on state irrespective of the control signal of the controller when the temperature detector detects a temperature greater than or equal to a predetermined value.

4 Claims, 9 Drawing Sheets

(56) References Cited

U.S. PATENT DOCUMENTS

2013/0249397 A1* 9/2013 Chandran et al. ............... 315/85
2014/0272649 A1* 9/2014 Hashim et al. ................ 429/429
2015/0112578 A1* 4/2015 Sakakibara ................... 701/113

FOREIGN PATENT DOCUMENTS

| JP | 2010-174721 A | 8/2010 |
| JP | 2010-183755 A | 8/2010 |
| JP | 2013-074741 A | 4/2013 |

* cited by examiner

FIG. 5A
Boosting command

FIG. 5B
CPU output

FIG. 5C
Transistor Q1

FIG. 5D
Transistor Q2

FIG. 5E
FET1

FIG. 8A
Boosting command

FIG. 8B
CPU output

FIG. 8C
Transistor Q1

FIG. 8D
Transistor Q2

FIG. 8E
FET1

FIG. 8F
Resistance value of thermistor TH1

FIG. 8G
On-threshold of transistor Q1

FIG. 9 ained Patent Publication No. 2013-74741, a thermistor is disposed near the rectifying switching element, and an abnormality of the rectifying switching element is detected when a voltage of the thermistor is greater than or equal to a threshold by temperature raise of the rectifying switching element. Japanese Unexamined Patent Publication Nos. 9-327120 and 2003-107123 also propose that temperature sensors such as the thermistor are provided near an element to detect the abnormality of the element. In Japanese Unexamined Patent Publication Nos. 9-327120 and 2003-107123, the temperature sensor detects a breakdown of a diode.

DC-DC CONVERTER THAT SUPPLIES VOLTAGE OF A DC POWER SUPPLY TO A LOAD WHILE BOOSTING OR STEPPING DOWN THE VOLTAGE OF THE DC POWER SUPPLY

CROSS-REFERENCE TO RELATED APPLICATION

This application is based on Japanese Patent Application No. 2013-233744 filed with the Japan Patent Office on Nov. 12, 2013, the entire contents of which are incorporated herein by reference.

FIELD

The disclosure relates to a DC-DC converter that supplies a voltage of a DC power supply to a load while boosting or stepping down the voltage of the DC power supply. More specifically, the disclosure relates to a DC-DC converter including a bypass circuit that constitutes a power supply path to the load during non-boosting or non-stepping-down.

BACKGROUND

For example, a DC-DC converter is mounted on an automobile as a power supply device that supplies a DC voltage to various in-vehicle devices and circuits. Generally the DC-DC converter includes a voltage conversion circuit (boosting circuit or step-down circuit) that is constructed with a switching element and an inductor. The DC-DC converter outputs a DC voltage that is boosted or stepped down by switching the voltage of the DC power supply at high speed.

In some DC-DC converters, the voltage conversion circuit is activated only when the boosting or stepping-down is required, and power is supplied to a load through not the voltage conversion circuit but a bypass circuit when the boosting or stepping-down is not required. Switching elements such as a relay and an FET (Field Effect Transistor) are provided in the bypass circuit. Japanese Unexamined Patent Publication Nos. 2010-183755, 2010-174721, and 2013-74741 disclose power supply devices including the bypass circuits.

Japanese Unexamined Patent Publication No. 2010-183755 discloses a power supply device that performs control such that both the voltage conversion circuit and the bypass circuit are put into an operation state during switching between a first state in which the power is output through the voltage conversion circuit and a second state in which the power is output through the bypass circuit.

Japanese Unexamined Patent Publication No. 2010-174721 discloses a start-up control device including an operation monitor that monitors a voltage at an output terminal of the bypass circuit and a controller that drives a boosting circuit to maintain the voltage at the output terminal of the bypass circuit at a predetermined level.

In a power supply circuit disclosed in Japanese Unexamined Patent Publication No. 2013-74741, a rectifying switching element is provided instead of a rectifying diode, and the rectifying switching element is driven to supply the voltage to the load while a bypass relay is maintained in an off state when an engine is restarted.

In Japanese Unexamined Patent Publication No. 2013-74741, a thermistor is disposed near the rectifying switching element, and an abnormality of the rectifying switching element is detected when a voltage of the thermistor is greater than or equal to a threshold by temperature raise of the rectifying switching element. Japanese Unexamined Patent Publication Nos. 9-327120 and 2003-107123 also propose that temperature sensors such as the thermistor are provided near an element to detect the abnormality of the element. In Japanese Unexamined Patent Publication Nos. 9-327120 and 2003-107123, the temperature sensor detects a breakdown of a diode.

In the DC-DC converter in which the FET is used as the switching element of the bypass circuit, the FET is put into an on state to form a current path from the DC power supply to the load through the FET during non-conversion of the voltage. During the non-conversion of the voltage, if the controller outputs a false signal to put the FET into the on state, and a current continues to pass through a parasitic diode connected in parallel to the FET, the FET generates heat to raise the temperature. As a result, the FET degrades, and the FET burns out at the worst.

SUMMARY

One or more embodiments of the disclosure provide a DC-DC converter that can prevent the degradation or burnout of the bypass circuit element even if the controller gives a false output.

A DC-DC converter according to one or more embodiments of the disclosure includes: an input terminal to which a DC power supply is connected; an output terminal to which a load is connected; a voltage conversion circuit that is provided between the input terminal and the output terminal, the voltage conversion circuit supplying a voltage of the DC power supply to the load while boosting or stepping down the voltage of the DC power supply; a bypass circuit that includes a switching element provided in parallel to the voltage conversion circuit, the bypass circuit supplying the voltage of the DC power supply to the load through not the voltage conversion circuit but the switching element when the switching element is in an on state; a drive circuit configured to turn on and off the switching element; a controller configured to output a control signal in order to control the voltage conversion circuit and the drive circuit; and a temperature detector configured to detect a temperature of a diode, the diode being connected in parallel to the switching element so as to be oriented toward a forward direction with respect to the DC power supply. At this point, the drive circuit maintains the switching element in the on state irrespective of the control signal of the controller when the temperature detector detects a temperature greater than or equal to a predetermined value.

In the above configuration, during the non-conversion of the voltage, when the controller falsely outputs the control signal to the drive circuit to put the switching element of the bypass circuit into the off state, the current passes through the diode connected in parallel to the switching element. Therefore, the temperature of the diode rises. The temperature of the diode is detected by the temperature detector. When the temperature of the diode is greater than or equal to a predetermined value, the switching element is put into the on state. Therefore, a bypass path is formed by the switching element, but the current does not continue to pass through the diode, which allows the switching element to be prevented from degrading or burning out due to the heat generation of the diode.

In the DC-DC converter, the temperature detector may be a thermistor having a characteristic that a resistance value decreases with increasing temperature. In this case, the drive circuit may include a transistor that is put into the on state by the control signal output from the controller, and the thermistor may be connected between a base and an emitter of the transistor.

In the DC-DC converter, the temperature detector may be a thermistor having a characteristic that a resistance value increases with increasing temperature. In this case, the drive circuit may include a transistor that is put into the on state by the control signal output from the controller, and the thermistor may be connected between a base of the transistor and the controller.

In the DC-DC converter, the switching element may be an FET, and the diode may be a parasitic diode of the FET.

One or more embodiments of the disclosure can provide the DC-DC converter that can prevent the degradation or burnout of the bypass circuit element even if the controller gives a false output.

DETAILED DESCRIPTION

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. A DC-DC converter incorporated in a vehicle will be described by way of example.

Figure 1:
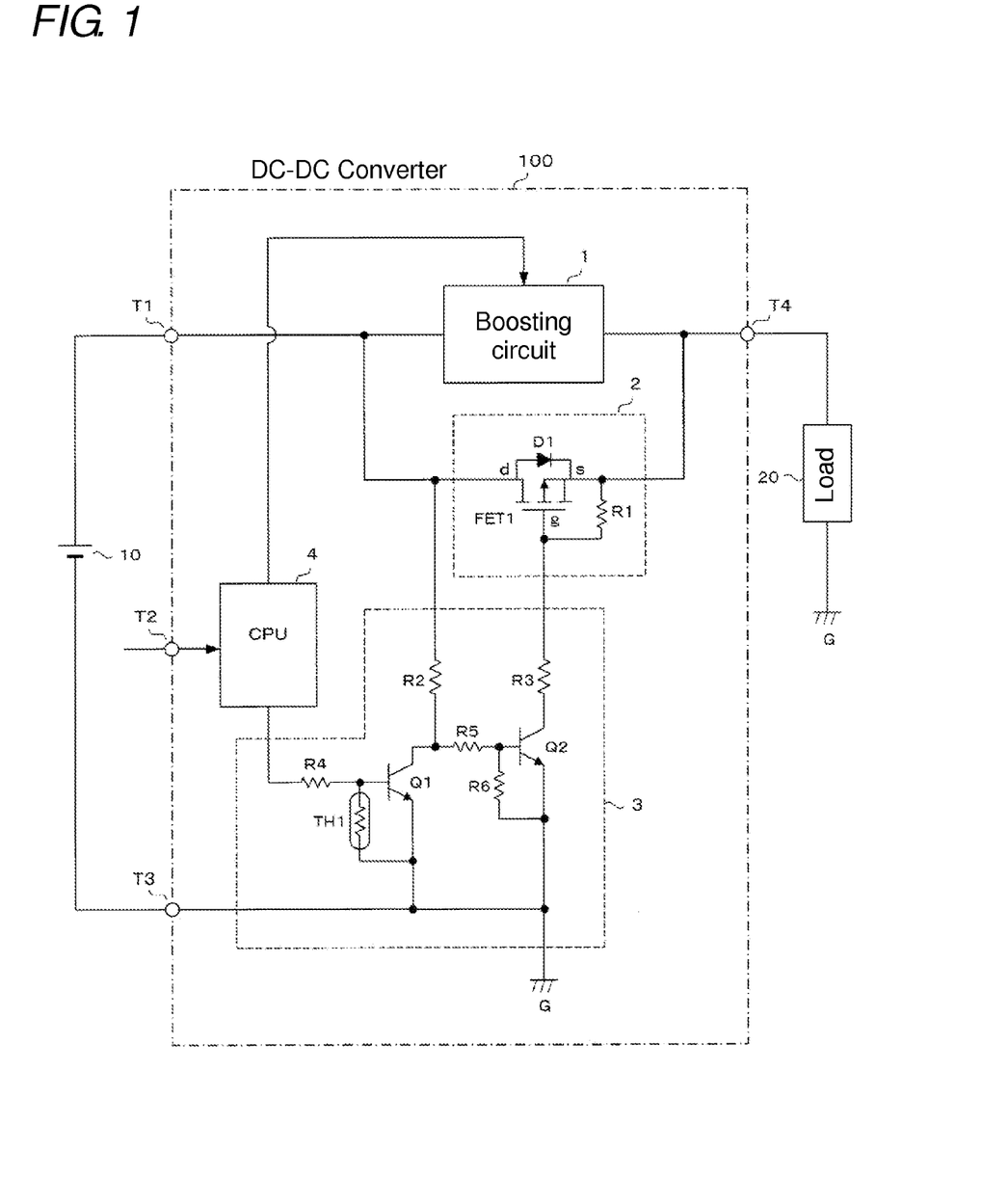
FIG. 1 is a circuit diagram illustrating a DC-DC converter according to one or more embodiments of the disclosure.

A configuration of a DC-DC converter will be described with reference to FIG. 1. A DC-DC converter 100 is provided between a DC power supply 10 and a load 20, and includes a boosting circuit 1, a bypass circuit 2, a drive circuit 3, a CPU 4, and terminals T1 to T4. The DC power supply 10 is a vehicle battery. The load 20 is an in-vehicle device in which power is supplied from the DC power supply 10.

A positive electrode of the DC power supply 10 is connected to the input terminal T1, and a negative electrode of the DC power supply 10 is connected to the ground terminal T3. The ground terminal T3 is connected to a ground G. One end of the load 20 is connected to the output terminal T4, and the other end of the load 20 is connected to the ground G. The external terminal T2 is connected to a high-order device such as an ECU (Electronic Control Unit).

Figure 2:
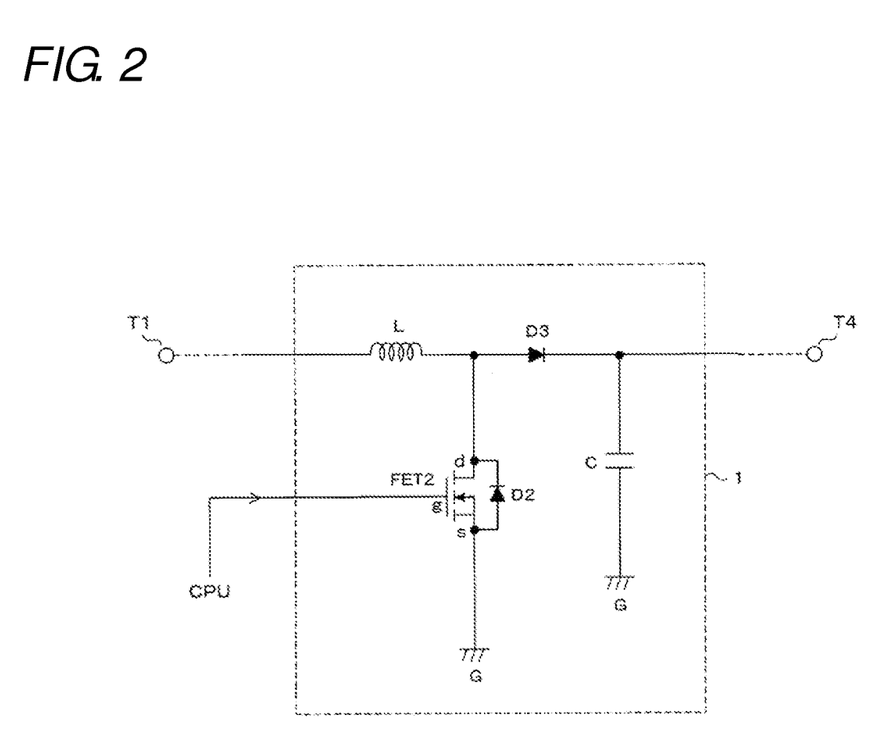
FIG. 2 is a circuit diagram illustrating a detailed boosting circuit.

The boosting circuit 1 is provided between the input terminal T1 and the output terminal T4, and boosts a voltage of the DC power supply 10 to supply the voltage to the load 20. FIG. 2 illustrates an example of the boosting circuit 1. The boosting circuit 1 includes an inductor L, a boosting field effect transistor FET2 (hereinafter, simply referred to as an "FET2"), a rectifying diode D3, and a smoothing capacitor C.

The FET2 that is of an n-channel MOS-FET is provided between a connection point of the inductor L and diode D3 and the ground G. A drain d of the FET2 is connected to the connection point, and a source s of the FET2 is grounded to the ground G. A gate g of the FET2 is connected to the CPU 4 (see FIG. 1). A diode D2 is connected in parallel to the FET2 so as to be oriented toward a reverse direction with respect to the DC power supply 10. The diode D2 is a parasitic diode between the drain d and the source s.

The bypass circuit 2 supplies the voltage of the DC power supply 10 to the load 20 without passing through the boosting circuit 1 during non-boosting. The bypass circuit 2 is provided in parallel to the boosting circuit 1. The bypass circuit 2 includes a bypass field effect transistor FET1 (hereinafter, simply referred to as an "FET1") and a resistor R1. A drain d of the FET1 is connected to the input terminal T1, and a source s of the FET1 is connected to the output terminal T4. A gate g of the FET1 is connected to the drive circuit 3. The resistor R1 is connected between the source s and gate g of the FET1.

The FET1 is a p-channel MOS-FET. A diode D1 is connected in parallel to the FET1 so as to be oriented toward a forward direction with respect to the DC power supply 10. The diode D1 is a parasitic diode between the drain d and the source s.

The drive circuit 3 turns on or off the FET1 of the bypass circuit 2. The drive circuit 3 includes transistors Q1 and Q2 and resistors R2 to R6. A collector of the transistor Q1 is connected to the input terminal T1 through the resistor R2, and connected to a base of the transistor Q2 through the resistor R5. An emitter of the transistor Q1 is grounded to the ground G. A base of the transistor Q1 is connected to the CPU 4 through the resistor R4.

A collector of the transistor Q2 is connected to the gate g of the FET1 through the resistor R3. An emitter of the transistor Q2 is grounded to the ground G. The resistor R6 is connected between the base and emitter of the transistor Q2.

A thermistor TH1 is connected to the base and emitter of the transistor Q1. The thermistor TH1 is disposed near the FET1 on a circuit board (not illustrated) to detect the temperature of the diode D1. In one or more embodiments of the disclosure, the thermistor TH1 is an NTC (negative temperature coefficient) thermistor having a characteristic that a resistance value decreases with increasing temperature.

The CPU 4 constitutes a microcomputer, and outputs a control signal in order to control the boosting circuit 1 and the drive circuit 3. The CPU 4 conducts communication with a high-order device (not illustrated) through the external terminal T2. Command signals such as a boosting command are input to the external terminal T2 from the high-order device.

In the above configuration, the boosting circuit 1 is an example of the "voltage conversion circuit" in one or more embodiments of the disclosure. The CPU 4 is an example of the "controller" in one or more embodiments of the disclosure. The FET1 is an example of the "switching element" in one or more embodiments of the disclosure. The thermistor TH1 is an example of the "temperature detector" in one or more embodiments of the disclosure.

An operation of the DC-DC converter 100 having the above configuration will be described below. The operation of the DC-DC converter 100 during a normal operation will be described with reference to FIGS. 3 to 5E.

Figure 3:
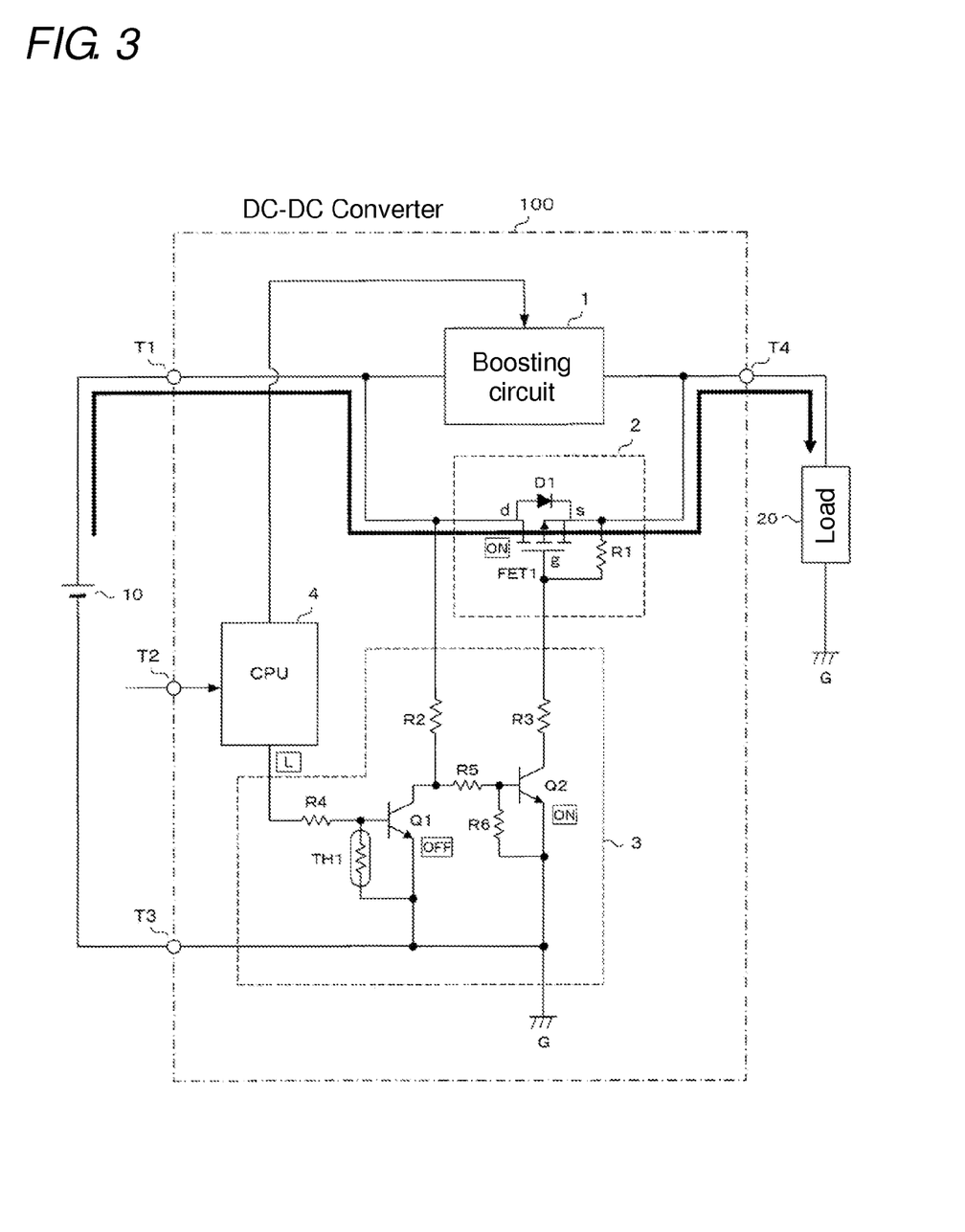
FIG. 3 is a circuit diagram illustrating a current path during non-boosting in a normal operation.

FIG. 3 illustrates a current path during non-boosting. During the non-boosting, the boosting command is not provided to the external terminal T2 from the high-order device. In such situations, the CPU 4 does not output the control signal driving the FET2 (FIG. 2) to the boosting circuit 1. Accordingly, in the boosting circuit 1, the FET2 is put into an off state, but a boosting operation is not performed. The CPU 4 outputs an L (Low)-level control signal to the drive circuit 3. Therefore, the transistor Q1 is put into the off state, and the transistor Q2 is put into an on state. A potential at the gate g of the FET1 of the bypass circuit 2 is decreased lower than a potential at the source s by the on state of the transistor Q2, thereby putting the FET1 into the on state. As a result, the current path is formed as indicated by a bold arrow in FIG. 3, and a DC voltage that is not boosted is supplied to the load 20 from the DC power supply 10 through the input terminal T1, the FET1, and the output terminal T4.

Figure 4:
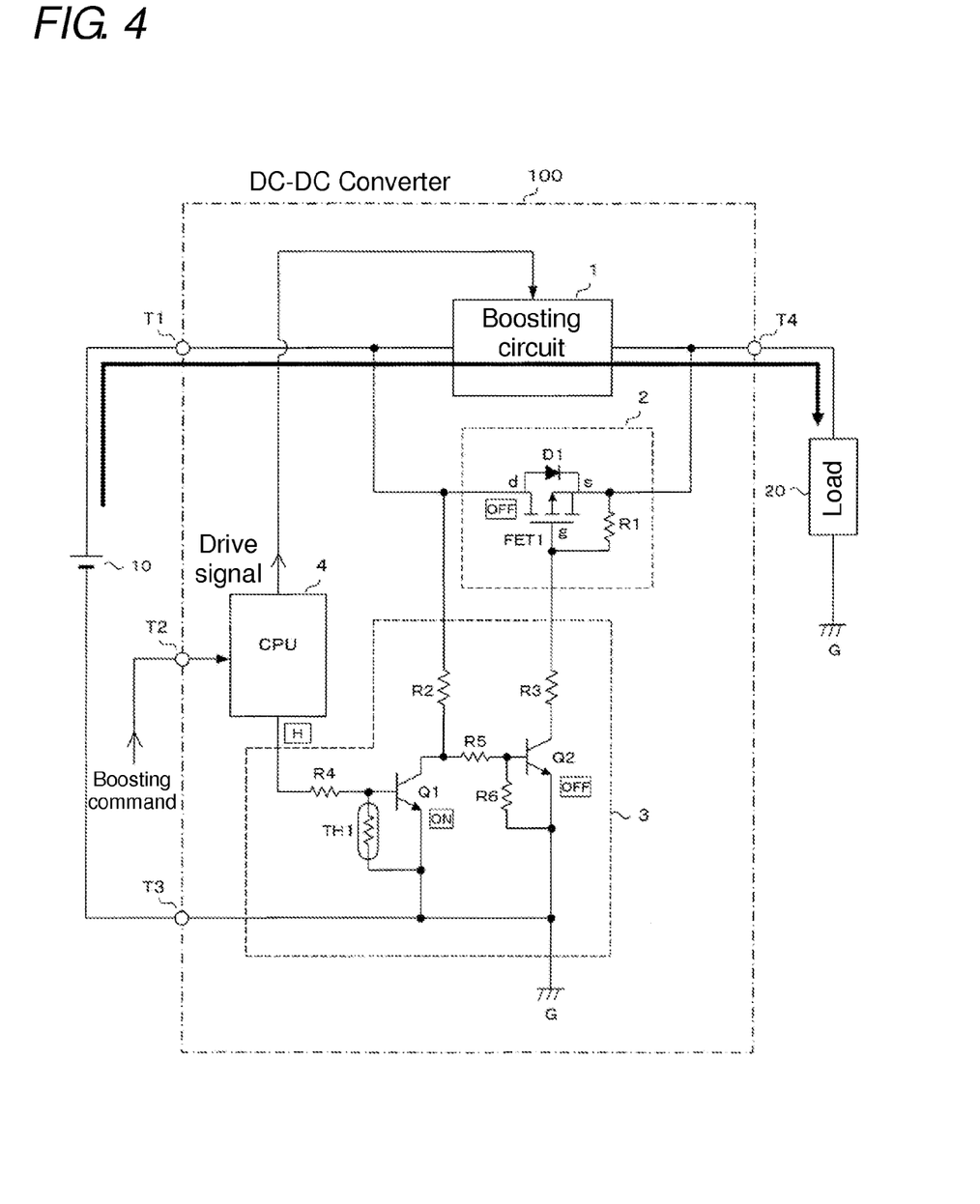
FIG. 4 is a circuit diagram illustrating the current path during boosting in the normal operation.

FIG. 4 illustrates the current path during boosting. During the boosting, the boosting command is provided to the external terminal T2 from the high-order device. In response to the boosting command, the CPU 4 outputs the control signal to the boosting circuit 1 in order to drive the FET2 (see FIG. 2). The control signal is a PWM (Pulse Width Modulation) signal, and is provided to the gate g of the FET2. Therefore, the FET2 performs a switching operation. A high voltage is generated at the inductor L by the switching operation, rectified by the diode D3, and smoothed by the capacitor C to become a boosted DC voltage. As a result, the current path indicated by the bold arrow in FIG. 4 is formed during the boosting, and the boosted DC voltage is supplied to the load 20 from the DC power supply 10 through the input terminal T1, the boosting circuit 1, and the output terminal T4.

The CPU 4 also outputs an H (High)-level control signal to the drive circuit 3 during the boosting. Because of the large resistance value of the thermistor TH1 in the normal operation state, the transistor Q1 is put into the on state by the H-level signal provided to the base. When the transistor Q1 is put into the on state, the potential at the base of the transistor Q2 decreases to put the transistor Q2 into the off state. The potential at the gate g of the FET1 of the bypass circuit 2 is increased higher than the potential at the source s by the off state of the transistor Q2, thereby putting the FET1 into the off state. As a result, the current path from the DC power supply 10 to the load 20 through the bypass circuit 2 is not formed.

Figure 5A:
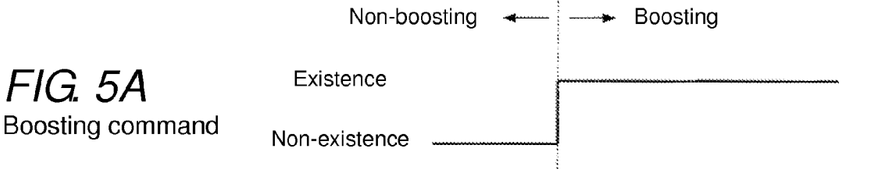
FIGS. 5A to 5E are timing charts illustrating operations in FIGS. 3 and 4.
Figure 5B:
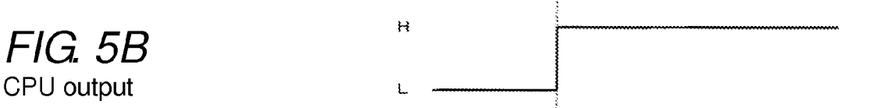
Figure 5C:
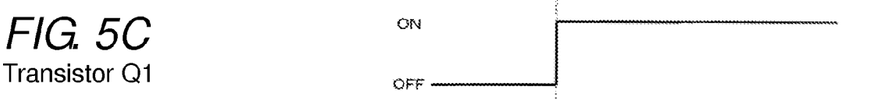
Figure 5D:
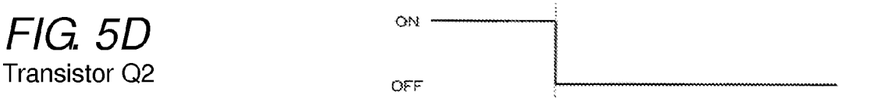
Figure 5E:
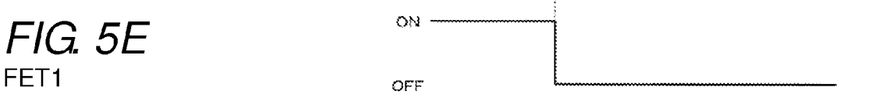

FIGS. 5A to 5E are timing charts illustrating the above normal operation. FIG. 5A illustrates the existence or nonexistence of the boosting command provided from the high-order device to the external terminal T2. FIG. 5B illustrates the control signal provided from the CPU 4 to the drive circuit 3. FIGS. 5C to 5E illustrate the on and off states of the transistor Q1, transistor Q2, and FET1.

An operation in the case that an abnormality is generated in the CPU 4 will be described with reference to FIGS. 6 to 8G.

Figure 6:
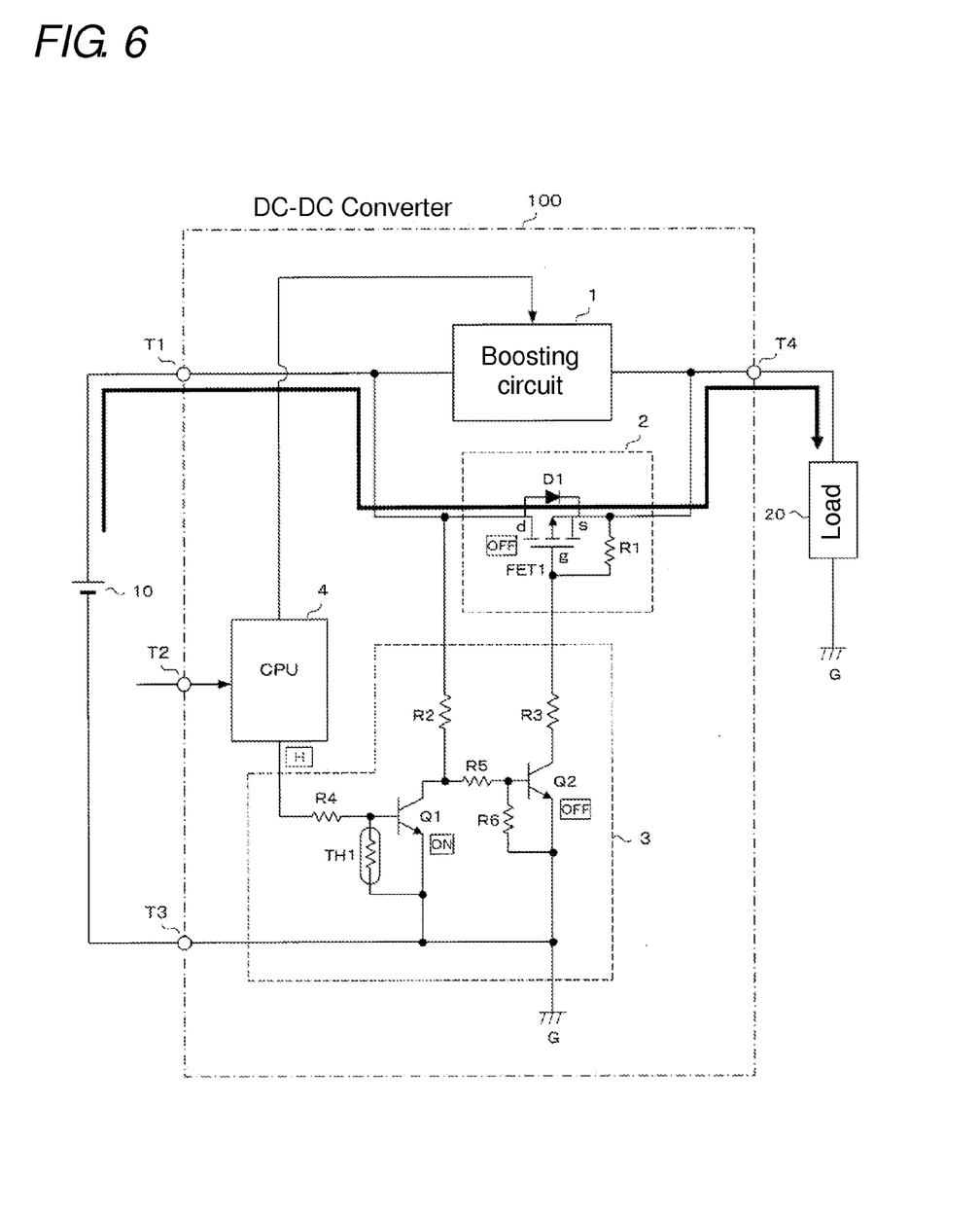
FIG. 6 is a circuit diagram illustrating the current path in an abnormal condition.

FIG. 6 illustrates a state in which the CPU 4 falsely outputs an H-level control signal although the boosting command is not provided to the external terminal T2. At this point, because the thermistor TH1 has still the large resistance value, the transistor Q1 is put into the on state while the transistor Q2 is put into the off state similarly to the case in FIG. 4. Accordingly, the FET1 of the bypass circuit 2 is put into the off state. On the other hand, the CPU 4 does not output the control signal (PWM signal) driving the FET2 to the boosting circuit 1. Accordingly, the boosting circuit 1 does not perform the boosting operation. As a result, the current path indicated by the bold arrow in FIG. 6 is formed from the DC power supply 10 to the load 20 through the input terminal T1, the diode D1, and the output terminal T4.

Figure 7:
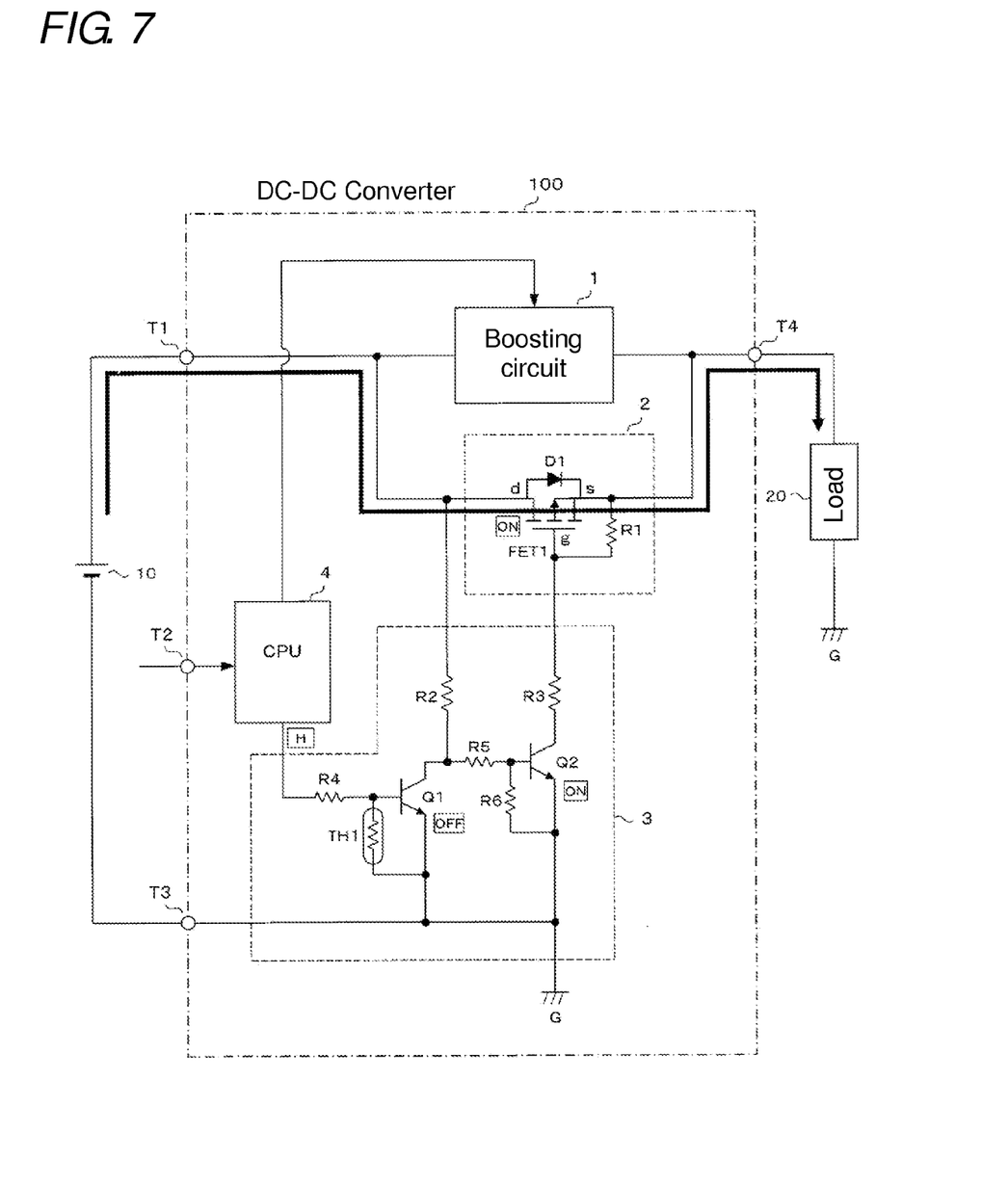
FIG. 7 is a circuit diagram illustrating the current path in an abnormal condition.

At this point, the diode D1 generates heat by a current passing through the diode D1. The thermistor TH1 provided near the FET1 detects the temperature of the diode D1. As described above, because the resistance value of the thermistor TH1 decreases with increasing temperature of the diode D1, the resistance value serves as a detection value of the thermistor TH1. When the thermistor TH1 detects the temperature greater than or equal to a predetermined value, namely, when the resistance value of the thermistor TH1 decreases to a given value, the transistor Q1 is put into the off state as illustrated in FIG. 7. Particularly, although the CPU 4 outputs the H-level control signal, the base potential at the transistor Q1 is lower than a base potential (on-threshold) necessary to put the transistor into the on state because the resistance value of the thermistor TH1 decreases. Therefore, the transistor Q1 is put into the off state.

As illustrated in FIG. 7, when the transistor Q1 is put into the off state, the transistor Q2 is put into the on state, and the FET1 of the bypass circuit 2 is also put into the on state. Therefore, the current path indicated by the bold arrow in FIG. 6 is switched to the current path indicated by the bold arrow in FIG. 7. As a result, similarly to the case in FIG. 3, the DC voltage that is not boosted is supplied from the DC power supply 10 to the load 20 through the FET1.

In the case of FIG. 6, when the current passing through the diode D1 is left as it is, the FET1 is subjected to high temperatures due to the heat generation of the diode D1. In the case that the FET1 degrades due to the heat, sometimes the FET1 burns out at the worst. On the other hand, in one or more embodiments of the disclosure, as described above, the thermistor TH1 detects that the temperature of the diode D1 is greater than or equal to the predetermined value, and the transistor Q1 is put into the off state irrespective of the H-level signal from the CPU 4. Therefore, the current does not pass through the diode D1 because the FET1 is put into the on state to form the current path in FIG. 7. As a result, the FET1 can be prevented from degrading or burning out due to the heat generation of the diode D1.

Figures 8A, 8B:
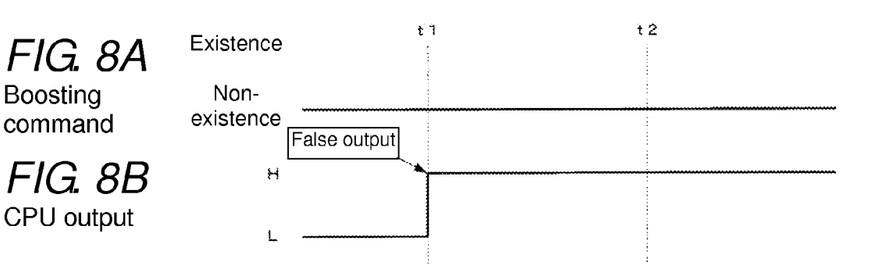
FIGS. 8A to 8G are timing charts illustrating operations in FIGS. 6 and 7.
Figure 8C:
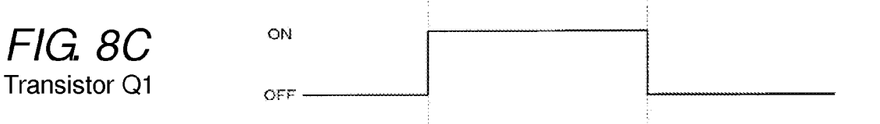
Figure 8D:
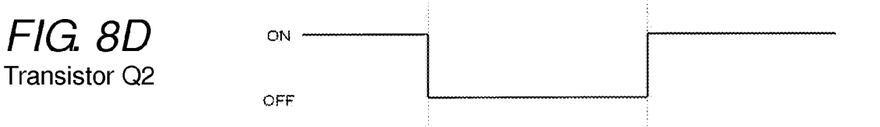
Figure 8E:
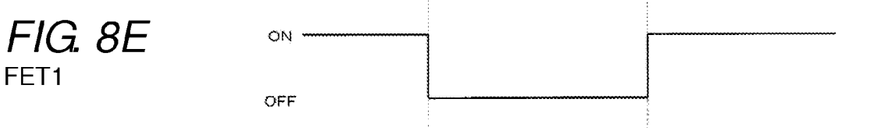
Figure 8F:
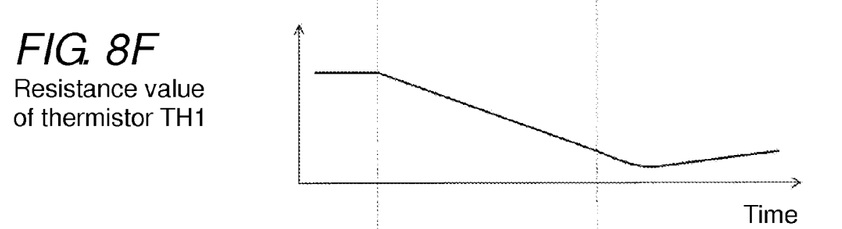
Figure 8G:
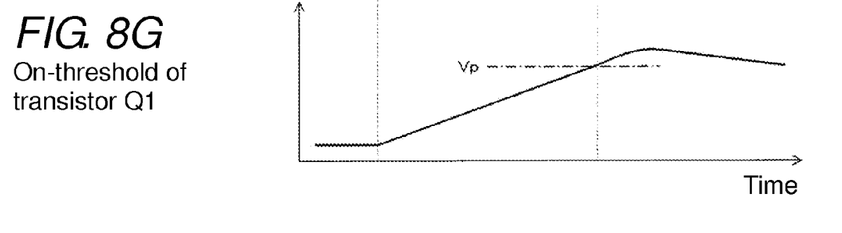

FIGS. 8A to 8G are timing charts illustrating the above abnormal operation. In the state in which the boosting command is not issued from the high-order device as illustrated in FIG. 8A, when the CPU 4 falsely outputs the H-level signal at a clock time t1 as illustrated in FIG. 8B, the transistor Q1 is put into the on state, the transistor Q2 is put into the off state, and the FET1 is put into the off state as illustrated in FIGS. 8C to 8E. Therefore, the current passes through the diode D1, and the diode D1 generates the heat, which decreases the resistance value of the thermistor TH1 as illustrated in FIG. 8F. On the other hand, the base potential threshold (on-threshold) necessary to put the transistor Q1 into the on state increases inversely to the resistance value of the thermistor TH1 as illustrated in FIG. 8G.

When the resistance value of the thermistor TH1 decreases to a given value at a clock time t2 as illustrated in FIG. 8F, the on-threshold of the transistor Q1 exceeds a voltage Vp (for example, 5 V) of the H-level signal output from the CPU 4 as illustrated in FIG. 8G. Therefore, as illustrated in FIGS. 8C to 8E, the transistor Q1 is put into the off state, the transistor Q2 is put into the on state, and the FET1 is put into the on state. Then, because the current does not pass through the diode D1, the on-threshold of the transistor Q1 decreases gradually while the resistance value of the thermistor TH1 increases gradually. In this case, at a time point the on-threshold decreases to the voltage Vp, the FET1 is put into the off state again when the CPU 4 outputs the H-level signal. However, similarly to the case at the clock time t2, the FET1 is put into the on state by the temperature raise of the diode D1. Then the operation is repeated, and the diode D1 does not become overheated because the current does not continue to pass through the diode D1.

As described above, in one or more embodiments of the disclosure, during the non-boosting, when the CPU 4 falsely outputs the control signal (H-level signal) to the drive circuit to 3 to put the FET1 of the bypass circuit 2 into the off state, the current passes through the diode D1 connected in parallel to the FET1. Therefore, the temperature of the diode D1 rises. The temperature of the diode D1 is detected by the thermistor TH1. When the temperature of the diode D1 is greater than or equal to the predetermined value, the FET1 is put into the on state. Therefore, the bypass path is formed by the FET1, but the current does not continue to pass through the diode D1, which allows the FET1 to be prevented from degrading or burning out due to the heat generation of the diode D1.

In one or more embodiments of the disclosure, the thermistor TH1 is connected between the base and emitter of the transistor Q1, and the transistor Q1 can automatically be put into the off state to put the FET1 into the on state when the temperature of the diode D1 is greater than or equal to the predetermined value. Therefore, a processing load on the CPU 4 is reduced compared with the case in which the detection value of the thermistor TH1 is taken in by the CPU 4 and compared to the threshold and the CPU 4 outputs the control signal in order to put the FET1 into the on state when the detection value is greater than the threshold.

The disclosure is not limited to the above embodiment, but various embodiments can be made as follows.

Figure 9:
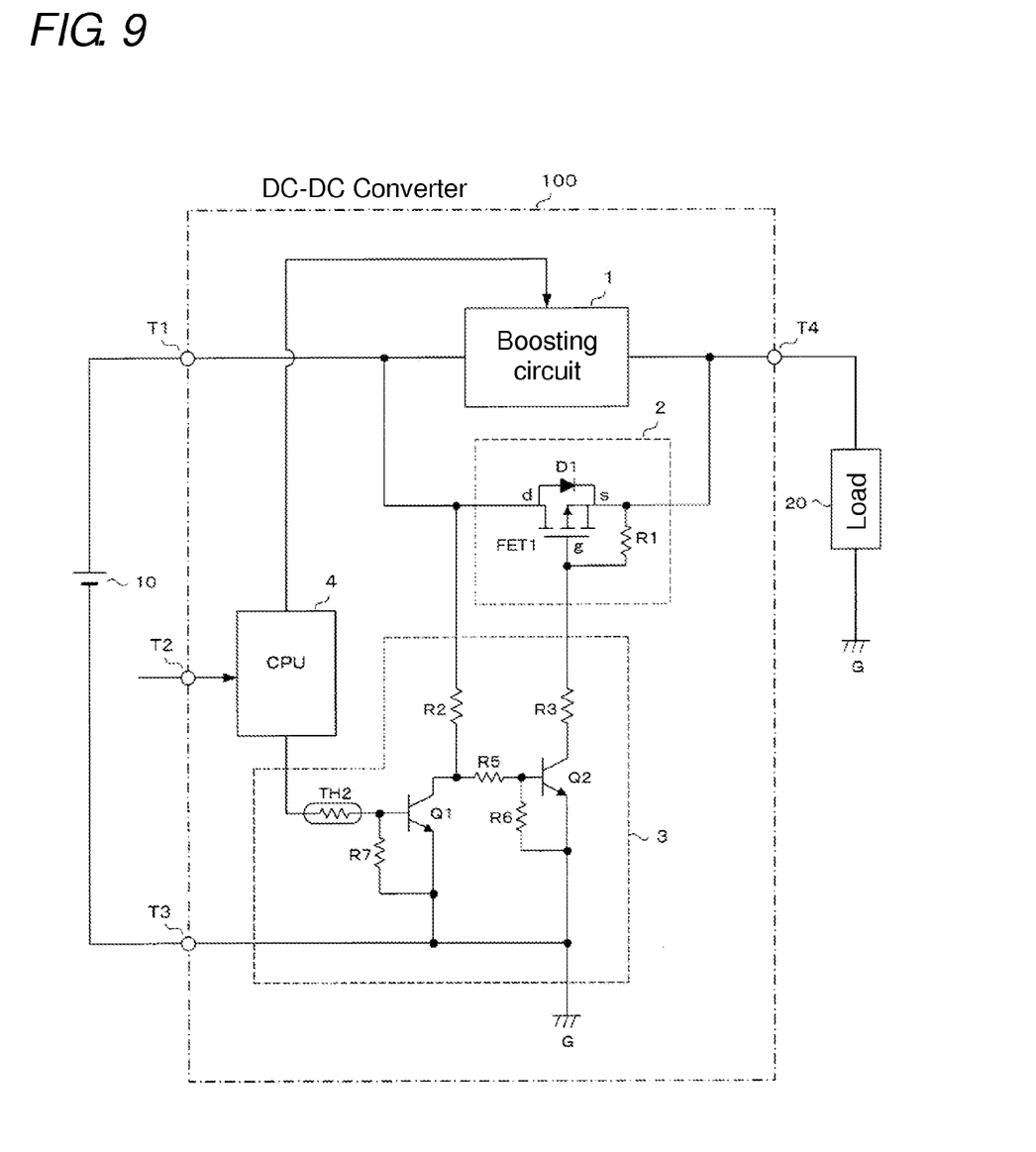
FIG. 9 is a circuit diagram illustrating a DC-DC converter according to one or more embodiments of the disclosure.

In an illustrative embodiment, the NTC thermistor in which the resistance value decreases with increasing temperature is used as the thermistor TH1. Alternatively, a PTC (Positive Temperature Coefficient) thermistor in which the resistance value increases with increasing temperature may be used instead of the NTC thermistor. In this case, as illustrated in FIG. 9, a PTC thermistor TH2 may be connected between the base of the transistor Q1 and the CPU 4 and a resistor R7 may be connected between the base and emitter of the transistor Q1. In one or more embodiments of the disclosure, not only the thermistor but also a platinum resistance temperature sensor may be used as the temperature detector.

In an illustrative embodiment, the transistors Q1 and Q2 are used as the switching element in the drive circuit 3. Alternatively, an FET may be used instead of the transistor.

In an illustrative embodiment, the rectifying diode D3 is provided in the boosting circuit 1. Alternatively, a synchronous rectification switching element (FET) that is put into the on and off states in synchronization with the FET2 may be provided instead of the rectifying diode D3.

In an illustrative embodiment, the FET1 including the parasitic diode D1 is used as the switching element of the bypass circuit 2. However, one or more embodiments of the disclosure are not limited to the FET1. For example, switching elements such as a transistor, an IGBT, and a relay may be used instead of the FET1, and a diode may be connected in parallel to the switching element.

In an illustrative embodiment, the boosting circuit 1 is cited as an example of the voltage conversion circuit. Alternatively, the boosting circuit 1 may be replaced with a step-down circuit according to a specification of the voltage to be converted.

In an illustrative embodiment, the FET1 of the bypass circuit 2 is the p-channel FET. Alternatively, the FET1 may be the n-channel FET. In this case, the drive circuit 3 may be changed according to the n-channel FET. Not only the FET1 of the bypass circuit 2 but also the FET2 of the boosting circuit 1 may be constructed with the p-channel FET.

In an illustrative embodiment, the DC-DC converter 100 mounted on the vehicle is described by way of example. However, the disclosure is also applicable to DC-DC converters except the in-vehicle DC-DC converter.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A DC-DC converter comprising:
an input terminal to which a DC power supply is connected;
an output terminal to which a load is connected;
a voltage conversion circuit that is provided between the input terminal and the output terminal, the voltage conversion circuit supplying a voltage of the DC power supply to the load while boosting or stepping down the voltage of the DC power supply;
a bypass circuit that comprises a switching element provided in parallel to the voltage conversion circuit, the bypass circuit supplying the voltage of the DC power supply to the load through not the voltage conversion circuit but the switching element when the switching element is in an on state;
a drive circuit configured to turn on and off the switching element;
a controller configured to output a control signal in order to control the voltage conversion circuit and the drive circuit; and
a temperature detector configured to detect a temperature of a diode, the diode being connected in parallel to the switching element so as to be oriented toward a forward direction with respect to the DC power supply,
wherein the drive circuit maintains the switching element in the on state irrespective of the control signal of the controller when the temperature detector detects a temperature greater than or equal to a predetermined value.

2. The DC-DC converter according to claim 1,
wherein the temperature detector is a thermistor comprising a characteristic that a resistance value decreases with increasing temperature,
wherein the drive circuit comprises a transistor that is put into the on state by the control signal output from the controller, and
wherein the thermistor is connected between a base and an emitter of the transistor.

3. The DC-DC converter according to claim 1,
wherein the temperature detector is a thermistor comprising a characteristic that a resistance value increases with increasing temperature,
wherein the drive circuit comprises a transistor that is put into the on state by the control signal output from the controller, and
wherein the thermistor is connected between a base of the transistor and the controller.

4. The DC-DC converter according to claim 1, wherein the switching element is an FET, and the diode is a parasitic diode of the FET.

* * * * *